H Getty.
Plumber's Tool.
No. 3,549. Reissued Jul. 13, 1869.
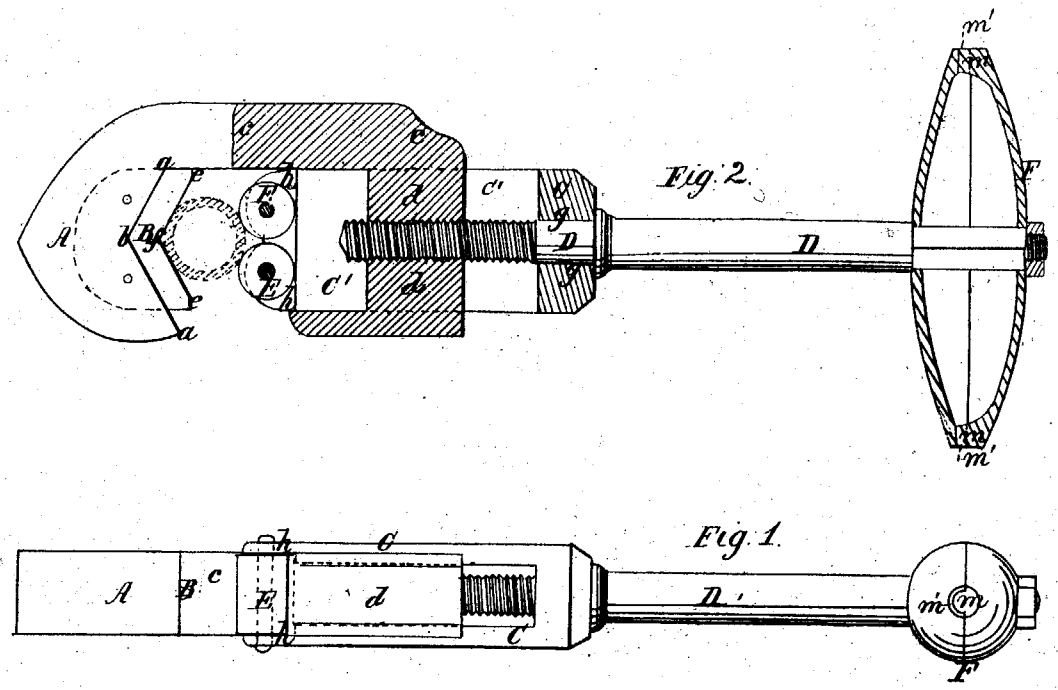
Witnesses;
M Coombs
C W Reed
Inventor;
Henry Getty

United States Patent Office.

HENRY GETTY, OF BROOKLYN, NEW YORK.

*Letters Patent No.* 67,530, *dated August* 6, 1867; *reissue No.* 3,549, *dated July* 13, 1869.

DIVISION B.

IMPROVED TUBE-CUTTER.

The Schedule referred to in these Letters Patent and making part of the same.

*To all whom it may concern:*

Be it known that I, HENRY GETTY, of Brooklyn, in the county of Kings, and State of New York, have invented certain new and useful Improvements in Tube-Cutters; and I do hereby declare that the following is a full, clear, and exact description of the same, reference being had to the accompanying drawings, making a portion of this specification, in which—

Figure 1 is an edge view of a tube-cutter, constructed according to my invention.

Figure 2 is a central longitudinal section of the same, taken at right angles to fig. 1.

Similar letters of reference indicate corresponding parts in both figures.

Before my invention, one or more cutting-wheels had been employed to separate a tube, by being rolled around the same under a powerful pressure. Such cutters, however, sometimes are started incorrectly, and cut in a screw-form, instead of going over the same groove; and, besides this, the surface of the tool that presses the pipe to the cutter becomes worn away by the friction and contact with the pipe.

The nature of my said invention consists in a tube-cutter, formed with a tool, and two cylindrical rollers, that receive the tube between them. The said rollers prevent the pipe from occupying a position diagonal to the cutter or cutters, and insure the action of said cutter or cutters always being at right angles to the axis of said pipe, thereby preventing the formation of a helical or screw-formed groove.

To enable others to understand the construction and operation of my invention, I will proceed to describe it, with reference to the drawings.

The head A of the apparatus is designed to have its inner side made V-shaped, as indicated at *a b*, in fig. 1, and is connected by a strong bar, *c*, with a rectangular block, *d*, the said head, bar, and block being formed in one piece, of any suitable metal.

Secured in the head A, in any suitable manner, and projecting inward from the inner side of the aforesaid head, is a cutter, B, the cutting-edge *e f* of which is V-shaped, or so that the two portions of the same stand at an angle to each other, as represented in fig. 2.

C shows a rectangular slide, formed with a large slot, C′, in which is situated the block *d* of the head A, the sides of the slide being fitted into broad and shallow grooves in the sides of the aforesaid block, in such manner as to be securely held thereon, and at the same time be capable of a longitudinal movement upon the same, such longitudinal movement being produced by means of a screw-shank, D, the inner end of which passes through a suitable hole, *g*, in the outer end of the slide C, and is screwed into a female screw in the block *d*, as shown in fig. 2, so that by turning the shank in one direction or the other, as the case may be, the slide may be moved in or out.

The innermost end of the slide C is open, and is furnished at each side with two inwardly-extending ears, *h*, forming bearings for the pivots of two rollers, E, which are placed so that the space between them is opposite the angle *f* of the cutter, but at right angles to the said cutter.

In using this implement, the inclined sides of the cutter form a rest, into which the pipe lies, and the cutter takes bearings at two points on the tube, so that when correctly started, at right angles to the axis of the tube, it cannot easily be turned out of its course, but will continue to cut correctly around the pipe, and finally separate the same, by the cutter being forced into the pipe gradually, as the tube-cutter is revolved around the tube, or *vice versa*, whereas, with rolling cutters, a screw-formed cut may be frequently produced by carelessness, and if a straight knife, cutting only at one point, were used, the friction would tend to roll the pipe along the cutting-edge.

With my V-shaped knife, the friction against one part of the cutting-edge tends to force the other part of the cutter against the pipe.

The knife, being set into the head A, as shown, may be removed for grinding, or in case of being broken.

By the use of the two friction-rollers in the tube-cutter, the pipe has a recess in which to lie, regardless of its size, and the rollers, in revolving around the pipe, cause the tube-cutter to travel in a plane at right angles to the axis of the pipe, thus preventing the diagonal action or end-movement of the cutters heretofore employed, that sometimes produce a screw-form on the pipe.

The rollers constantly press down the burr produced by the cutters, so that when the pipe is separated there will be nothing to interfere with the action of the screw-dies generally employed for cutting a screw-thread on the pipe.

The handle F is hollow, and is formed of two concave sections of cast-metal, which are placed, together with the outer end of the screw-shank D, passing through suitable holes formed therein, as indicated in fig. 2, the two sections being tightened together by a suitable nut at the extremity of the said shank, or by other suitable means.

The ends of one of the aforesaid sections are constructed with projections *m*, shown more clearly in fig. 1, which, when the handle is put together, fit into recesses *m′* formed in the ends of the other section, in such manner as to effectually prevent any lateral slipping or displacement of the two sections with reference to each other, a cheap and easily-constructed handle being by these means secured.

What I claim, and desire to secure by Letters Patent, is—

1. A tube-cutting instrument, formed with two rollers, for sustaining the pipe in the groove between them in a position parallel to the axis of said rollers, in combination with a cutter for cutting the tube, (an open jaw, in which the parts are mounted,) and a lever, or handle, whereby the instrument is capable of being revolved around a pipe or other cylindrical article for operating the same, substantially as set forth.

2. The slide C, with its slot *c'*, containing the block *d* of the head A, in combination with the screw D and rollers E, substantially as and for the purposes set forth.

3. The V-shaped cutter B, held in a head-block, in combination with a pair of cylindrical rollers E E, and mechanism substantially as specified, for operating on such parts in cutting tubes.

4. The V-shaped cutter B, in combination with a pair of cylindrical rollers E E, block *d*, slide C, and screw D, substantially as set forth.

In witness whereof, I have hereunto set my signature, this 12th day of September, A. D. 1867.

HENRY GETTY.

Witnesses:

CHAS. H. SMITH,

GEO. T. PINCKNEY.